United States Patent [19]
Pelzer

[11] Patent Number: 5,212,349
[45] Date of Patent: May 18, 1993

[54] CABLE DUCT WITH DETECTOR WIRE

[75] Inventor: Rudolf Pelzer, Herzogenrath, Fed. Rep. of Germany

[73] Assignees: Kabelwerk Eupen AG; Cablerie D'Eupen S.A.; Kabelfabriek Eupen N.V., Eupen, Belgium

[21] Appl. No.: 673,318

[22] Filed: Mar. 22, 1991

[30] Foreign Application Priority Data

Mar. 23, 1990 [BE] Belgium ............................... 9000324

[51] Int. Cl.$^5$ ........................................ H02G 3/04
[52] U.S. Cl. ................................ 174/98; 174/68.3
[58] Field of Search ............... 174/68.3, 95, 97, 98, 174/72 R, 112

[56] References Cited

U.S. PATENT DOCUMENTS

| 300,470 | 6/1884 | Hathaway | 174/97 |
|---|---|---|---|
| 2,647,160 | 7/1953 | Hood | 174/98 |
| 3,367,370 | 2/1968 | Sherlock | 138/104 |
| 3,404,268 | 10/1968 | Fowler | 362/382 |
| 3,555,170 | 1/1971 | Thessalonikis | 174/47 |
| 3,713,947 | 1/1973 | Hawkins | 156/293 |
| 3,812,282 | 5/1974 | Johansson | 174/68 C |
| 4,098,636 | 7/1978 | Gabriel | 156/498 |
| 4,168,198 | 9/1979 | Stanley | 156/393 |
| 4,524,808 | 6/1985 | Fleischer | 174/47 |

FOREIGN PATENT DOCUMENTS

| 010835 | 5/1980 | European Pat. Off. . |
|---|---|---|
| 0159307 | 5/1990 | European Pat. Off. . |
| 2248441 | 4/1974 | Fed. Rep. of Germany . |
| 1552682 | 11/1968 | France . |

*Primary Examiner*—Morris H. Nimmo
*Attorney, Agent, or Firm*—Leydig, Voit & Mayer

[57] ABSTRACT

In a process and a device for fitting at least one electrically conducting detector wire in a plastic cable duct which can be laid in the ground so that said detector wire is embedded and surrounded on all sides, it is suggested to make a wire-receiving groove in a wall of the duct, then to lay the wire in the receiving groove, and finally to lead a separate, softened filler material into the receiving groove and weld it to the duct wall. In this way, the detector wire is reliably embedded in the duct-wall.

11 Claims, 8 Drawing Sheets

CABLE DUCT WITH DETECTOR WIRE

DESCRIPTION

This invention concerns a process for applying at least one electrically conducting detector wire in a plastic cable duct designed for laying in the ground, in which the wire is embedded and entirely surrounded in the duct wall, running along a neutral bending line parallel to the axis of the cable duct.

In order to be able to detect a plastic cable duct at any required moment, it is necessary for the duct to have a metallic conductor running along it. For nonmetallic fiber optic cables laid inside plastic ducts, without a separate metal core, it is necessary to include at least one electrically conducting detector wire for this purpose. EP-A-0 159 307 describes a process of the type mentioned in the preamble, in which the detector wire is drawn through gas flames in order to heat it before being applied to the duct wall. The hot wire is pressed against the duct wall, which melts in its vicinity, so that as a result the wire becomes embedded in the wall. The aim is for the duct wall material to surround the wire which is pressed into it, and unite with the wire so intimately that the wire is completely embedded and enclosed on all sides, without any pores or cracks leading to the outside. It is important for it to be enclosed in this way, since it is necessary to ensure that over the years or decades the detector wire does not become interrupted at points along it as a result of moisture-induced corrosion. There is also the danger that with the known process, if the process parameters are not maintained exactly, in particular the preheating temperature of the wire, the latter will either become only slightly embedded in the duct wall, so it may become exposed by rough handling during installation, or it will sink too deeply into the duct wall, so that in certain cases it will not meet the contact elements of the cable connector when one is fitted. Finally, only detector wire which can be sufficiently strongly heated can be used.

EP-A-0 159 307 describes a further process, in which by means of a special extruder nozzle, the detector wire is led out of the extruder directly into the duct wall as it is being extruded, before the duct leaves the extruder. In addition to requiring a special extruder nozzle, this has the disadvantage that the exact depth of the wire inside the duct wall is not absolutely controlled, since during the process of introducing the wire the duct wall is still very soft and easily deformable.

The present invention aims to provide a process of the type mentioned in the preamble, which enables exact positioning of the detector wire inside the duct wall, so that it is reliably enclosed on all sides. This aim is achieved by:

a) fashioning a wire-receiving groove in the duct wall along the neutral bending line of the duct;
b) then laying the wire the groove;
c) finally introducing a special, softened filler material into the groove and welding it to the duct wall.

The shape and in particular the depth wire-receiving groove can be defined with great accuracy. Accordingly, the position of the wire laid in the groove can be predetermined. The special softened filler material reliably covers the groove, and thus the wire laid in it, and as a result of being welded to the duct wall ensures that no cracks or pores occur through which moisture could reach the wire. Since the wire does not have to be heated, a lacquered wire can be used, without any other precautions, preferably enameled copper wire.

The filler material is preferably led into the wire-receiving groove from an extruder, preferably a worm extruder, in particular because it is easy to regulate the extrusion speed (which in accordance with the invention depends on the feed rate of the duct).

IN order to facilitate the welding of the filling material to the duct wall, which is already solidified and therefore relatively cold, it is recommended to heat the wire-receiving groove, preferably to melting temperature, preferably with a hot air blower.

It is further recommended to lead the wire through a wire brake before it is laid in the groove, in order to put it under tension in the groove. This ensures that the wire runs as straight as possible in the groove and prevents undulations which would be detrimental to the required exact positioning of the wire. The actual tension on the wire is taken up by the duct, which has already been produced and is continuously being coiled up, since the wire is solidly bonded to it by the filler material, which has hardened in the meantime.

The wire-receiving groove can be made in various ways. In a preferred embodiment, the groove is formed by stock removal, either by milling or by being cut out. Alternatively, the wire-receiving groove can be impressed into the duct wall while it is soft, preferably with the help of a tube which fits around the duct, with a suitably shaped spur projecting from the inside, corresponding in shape to the cross-section of the wire-receiving groove. The use of a correspondingly shaped gauge tube is particularly preferred, since such a tube, which in any case is necessary for gauging the cable, can easily be modified accordingly. After leaving the cooling section containing this gauge tube, the duct wall together with the wire-receiving groove is sufficiently hardened, so that the detector wire assumes the required depth with great accuracy after being led into the groove and being covered with filler material.

Various shapes are possible for the cross-section of the groove. A V-shaped cross-section is particularly preferred for the groove, because it gives the possibility of exact positioning.

Since, as has already been mentioned, the detector wire does not have to be strongly heated, enameled wire can be used, so that the wire itself is protected against mechanical damage and thus against corrosion, even if the duct wall becomes damaged during installation.

It is also possible to use the process described above for applying a detector wire at a later time, after the duct has been manufactured. However, a more-or-less "in-line" process is particularly preferred, i.e. the detector wire is embedded during the process of manufacturing the duct, preferably in the case of a groove which is made by stock removal after the extruded duct has passed through a cooling section, or in the case of a groove which is impressed by a gauge tube, directly after it leaves the duct extruder.

The invention further concerns a device for incorporating at least one electrically conducting detector wire in a plastic duct designed for laying in the ground, where said detector wire is inserted from the outside of the duct and is embedded in the duct wall so that it is surrounded on all sides, incorporating:

wire feeder for supplying the detector wire to the duct:

a device for embedding the detector wire in the duct wall;

a system of rollers for leading the duct through the device, in particular in order to carry out the process described above.

Such a device is already known from EP-A-0 159 307 mentioned above. In this, the device for embedding the detector wire consists of a heating device formed by gas burners, which heats the wire so strongly that the material of the duct melts locally after the wire is led to it over a wire direction changing roller, in order to make possible the required embedding of the detector wire in the duct wall. As already mentioned in the preamble, this can result in faulty embedding of the detector wire in the duct wall.

In order to make a device for producing duct with a perfectly embedded detector wire, it is suggested that:

a device for fashioning a receiving groove for the detector wire in the duct wall is incorporated in the transport mechanism before the wire feeder mechanism;

the wire feeder mechanism is designed for laying the detector wire in the receiving groove;

there is a device for supplying a separate, softened filler material into the receiving groove with the detector wire in it, and welding said material to the duct wall.

In order to ensure perfect welding of the filler material to the duct wall, it is recommended that heating device for warm the material of the duct wall is mounted in the vicinity of the receiving groove, preferably directly before the filler supply device. This heating device in general also heats the detector wire-inside the receiving groove, but only to a temperature in the region of the melting temperature of the material of the duct, i.e. substantially less than the gas burner in the-state-of-the-art mentioned above.

It is therefore quite sufficient for the heating device to consist of a hot air blower, with a slit nozzle extending along a section of the receiving groove and located at a very slight distance from it.

In order to ensure correct dosing of the filler material, it is suggested that the device for supplying the filler material should consist of an extruder, preferably a worm extruder. In order to ensure that the filler material introduced into the groove has the desired surface form and completely fills the bottom of the groove, together with the detector wire, it is suggested that the extruder should be fitted with an applicator which lies against the duct wall, where said applicator is preferably made of Teflon, and has a channel for leading the filler material into the receiving groove, and has a moulding surface which determines the surface shape of the filler material introduced into the groove.

Here it is possible for the moulding surface to be shaped so that the surface of the filler material either projects from the duct wall, or is level with it.

In order to ensure the desired complete filling of the receiving groove automatically, independently of any variations in the transport speed of the duct, it is suggested there be a regulating device to regulate the extrusion speed according to the transport speed of the duct.

In order to ensure low construction costs, and yet maintain high precision for the required fashioning of the receiving groove in the duct wall, it is suggested that the device for fashioning the receiving groove should consist of a milling machine, preferably with a rotating-grind wheel.

The preferred V shape for the receiving groove can be simply achieved by setting the grind wheel at an angle, preferably 45°. In this way a conventional grind wheel with rectangular cross-section can be used.

Here it is preferred to use a suction device to remove the millings.

Alternatively, however, the device for fashioning the receiving groove can consist of a fixed draw-knife with a cutter of the required shape corresponding to the cross-section of the receiving groove. It is suggested that the draw-knife should be capable of being heated, preferably by ohmic heating, in particular in order to reduce the force required.

In a further alternative, the device for fashioning the receiving groove consists of a tube surrounding the duct, with a correspondingly shaped spur projecting from the inside, corresponding to the required sectional shape of the receiving groove, where said tube is preferably in the form of a gauge tube.

The wire direction-changing roller already mentioned above with reference to the known device has a groove in its circumference for the detector wire. The wire direction-changing roller rolls along the outside of the duct on either side of the detector wire laid in the groove. In the present invention, however, the wire direction-changing roller has a circumferential projection which enters the receiving groove, preferably pressing against it, where said circumferential projection bears the circumferential groove. Since the circumferential projection enters the receiving groove, the wire can be introduced into the groove with the required depth, preferably directly on the bottom of the groove. This preferred entering of the circumferential projection into the receiving groove ensures precise relative positioning of the wire direction-changing roller, and thus correspondingly correct positioning of the wire in the receiving groove.

In this case, the circumferential projection preferably has angled sides which lie flat against the sides of the V-shaped receiving groove, giving an additional centering action.

In order to reliably position the wire exactly straight inside the receiving groove, it is suggested to have a wire brake which sets the wire under tension in the receiving groove.

In a preferred embodiment, the wire brake consists of a tension wheel around which the detector wire makes a full turn, where said wheel is provided with a brake, preferably in the form of a brake band lying against its circumference. Such a wire brake is simple in construction and reliable in operation; the braking effect can be simply varied by altering the brake band pressure.

The known device has a system of rollers formed by rollers lying opposite each other whose axes are parallel to each other in order to guide the duct. One of the rollers which lie opposite each other is sprung so that it is held against the circumference of the duct. If in this arrangement fairly strong side forces arise, these may not be sufficiently compensated. In order to provide reliable guiding of the duct, in contrast to this, it is suggested that the roller system for guiding the duct consist of at least one system of guide rollers, with a first guide roller on one of the two sides of the receiving groove, and a second guide roller on the other side, where the axes of said guide rollers are parallel to each other, and to a plane running through the receiving groove and the axis of the cable, and with a third guide roller on the side of the duct opposite the receiving groove, where the axis of said third guide roller is perpendicular to the axes of the first and second guide rollers, and where all the roller axes are perpendicular to the axis of the duct. In this arrangement, the duct is supported and guided firmly and accurately, so that forces acting on the duct when the detector wire is being fitted, and in particular when the receiving groove is being fashioned in the duct wall, can be safely absorbed without deformation or vibration of the duct wall.

It is particularly preferred for the first and second guide rollers to lie against the duct wall, covering an arc of about 90°, starting from the r of the receiving groove. In such a case, the third guide roller can lie against the duct wall covering an arc between 90° and 170°. The third accordingly has its smallest diameter in about the middle of its length, lying opposite the receiving groove, where it rolls frictionlessly against the duct. The first and second guide rollers, on the other hand, each have their smallest diameter at the end nearest the third guide roller, so that this end also rolls against the duct circumference practically without friction. The first and second guide rollers can each be made in the form of half of the third guide roller. In this way, the three guide rollers cover and support the duct around nearly its whole circumference.

In order to ensure the necessary absence of play, it is suggested for the third guide roller to lie against the duct under spring tension.

The invention further concerns a plastic cable duct which can be laid in the earth, with at least one electrically conducting detector wire embedded in the duct wall and fully surrounded, running along a neutral bending line in the duct 3. This cable duct has a receiving groove for the detector wire, is welded with a separate filler material, and the detector wire is embedded in the duct wall without any pores or cracks.

In order to increase the certainty of detection, the duct is provided with two detector wires running along diametrically opposite, neutral bending lines in the duct.

It is preferred the duct and filler material which is applied in a heated state to the groove be made of the same synthetic plastic, preferably high density polyethylene HDPE with a copper wire as the detector wire, preferably an enameled copper wire.

The invention also concerns connector a device for making an electrically conducting connection between sections of cable duct, each of which has at least one electrically conducting detector wire embedded in the duct wall and enclosed on all sides, in particular sections of cable ducts of the type just described. Such a device is necessary in order to connect joints between successive cable duct sections in an electrically conducting manner, by bridging any branches, couplings, elbows or suchlike in the joint as necessary. According to the invention, this connector device has two collars, each of which has separable elements which close around one of the duct sections concerned, where each collar has a knife contact which cuts into the duct wall, and makes contact with the detector wire when the collar is closed, and where each has at least one electrically conducting cable in order to make an electrically conducting connection between one knife contact in one of the two collars, and one knife contact in the other collar. The connector device according to the invention is extremely simple to install, even by unskilled workers, since the electrical contact is made automatically when the particular collar is closed. At least one electrically conducting cable with sufficient length of preferably 1 m then connects the two collars.

In order to ensure a perfect electrical connection between the knife contact and the detector wire, the knife contact preferably has two blades at a distance from each other in the direction of the axis of the duct. The knife contact is preferably made of brass, so that it is inexpensive to manufacture and also sufficiently hard to be able to penetrate the copper wire.

In order to protect the contact point from environmental influences, a sealing system is suggested, in order to outwardly seal the point of contact between the knife contact and the detector wire.

In order to provide a simple manner of preventing moisture penetrating along the circumference of the duct, it is suggested that the sealing system consist of a sealing ring applying tightly around the contact knife between the duct circumference and the collar, preferably made of closed pore foam material, preferably neoprene foam.

In order to seal the knife contact opposite the collar in the area of the connection to the electrically conducting cable, a corresponding ring is used in this area.

In order to be able to close the collar in a simple manner so that it can nevertheless bear a mechanical load, it is suggested that the collar, which be preferably in two parts, is closed around the circumference of the jacket by means of screw joints.

In order for the collar to be inexpensive to manufacture and yet have high resistance to corrosion, it is suggested that the collar be made of plastic, preferably injection-moulded UPVC.

The invention is described below with the aid of several embodiment examples, showing.

By means of the apparatus 10 shown in FIG. 1, described in greater detail below, cable ducts 12, in particular for fiber optic cables can be provided with at least one and preferably two detector wires 14 during their manufacture, thus ensuring that said wires 14 are reliably embedded in the duct wall 16 and enclosed on all sides, so that they are protected against corrosion.

Figure 1:
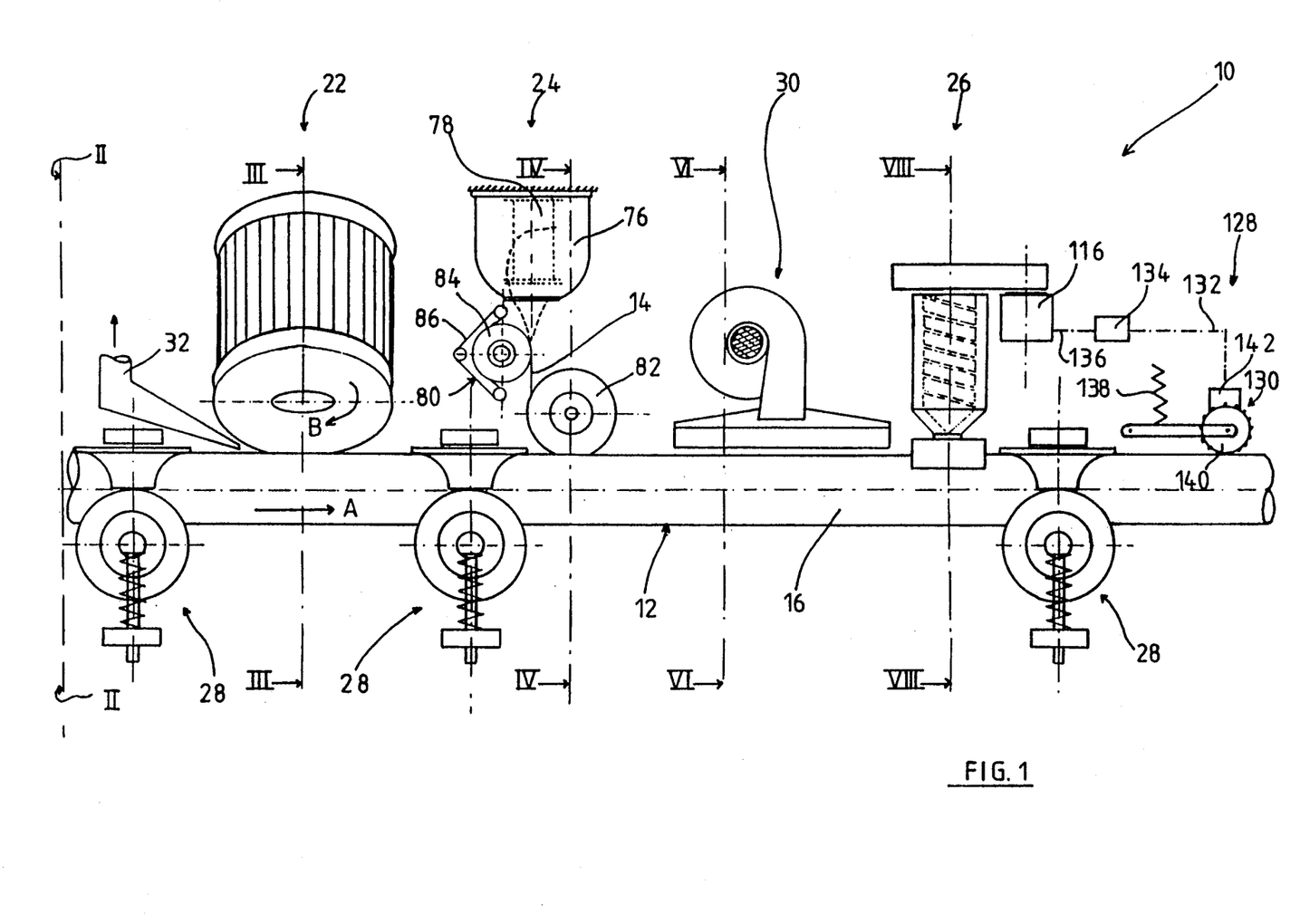
FIG. 1 a simplified overall view of an apparatus according to the invention for applying a detector wire in a cable duct and more precisely in the wall of the duct.

In FIG. 1, a duct emerging from an extruder (not shown in the diagram) is transported from left to right (arrow A) and then brought into its transport form, in particular coiled, where the coil axis is parallel to the plane of the drawing. Before reaching the device 10, the cable duct 12 runs through a cooling and gauging device (also not shown).

Figure 5:
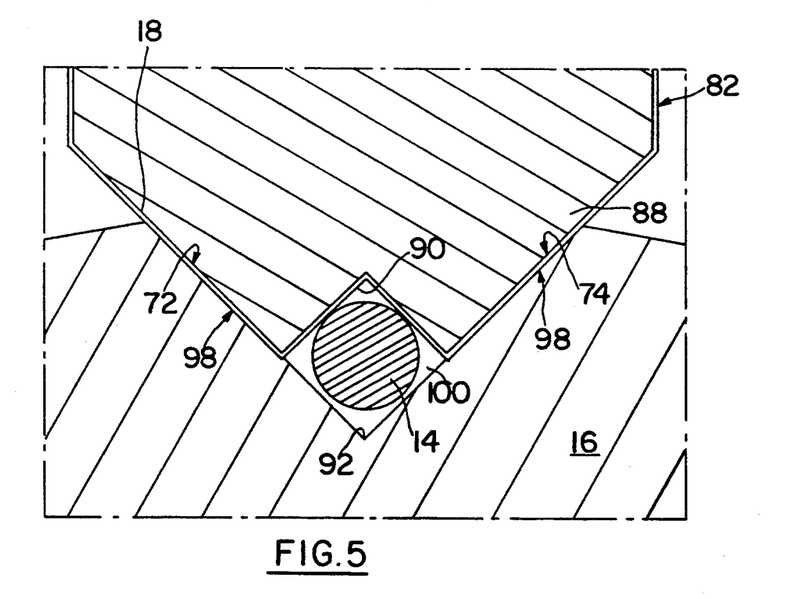
FIG. 5 a detail view of detail V in FIG. 4.
Figure 7:
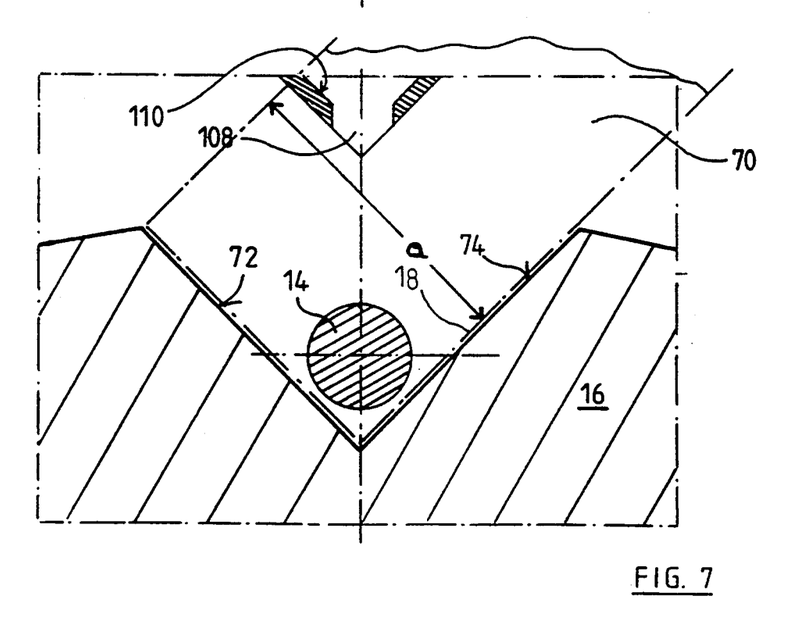
FIG. 7 a detail view of the section VII in FIG. 6.

In accordance with the invention, a preferably V-shaped receiving groove 18, as for example shown in FIGS. 5 and 7, is fashioned in the duct wall 16, and the detector wire 14 is led into said groove 18 in the area of the base of the groove, after which the groove 18 is filled with a separate softened filler material 20.

Figure 2:
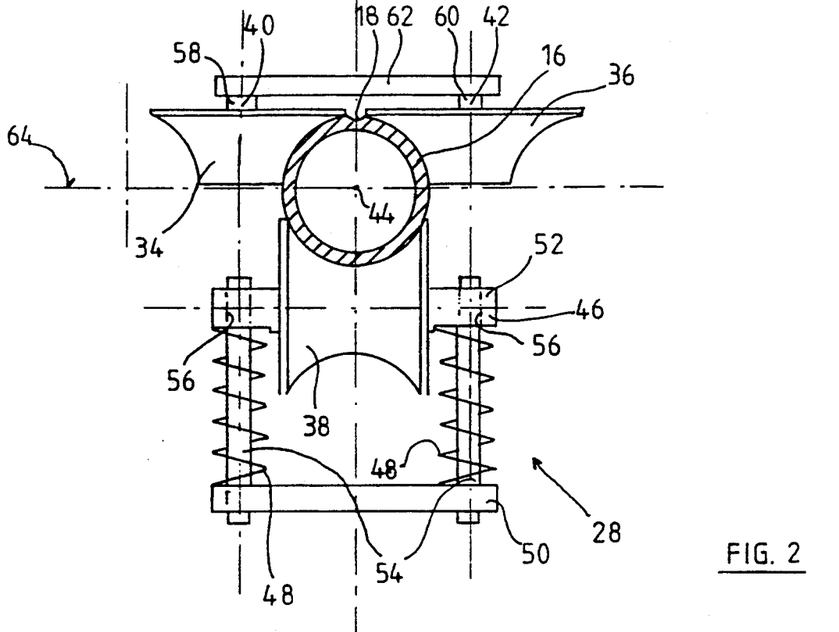
FIG. 2 a sectional view of the arrangement in FIG. 1 along line II—II.

Accordingly, the device 10 has the following work stations: a fashioning device 22 for fashioning the receiving groove 18; a wire feeder 24 for laying the detector wire 14 in the receiving groove 18; a supply device 26 for supplying the filler material 20 into the receiving groove 18 containing the detector wire 14, and for welding it to the duct wall 16. In order for the cable duct 12 to be led past, accurately supported and guided by the device 10, there are several guide roller systems 28 at a distance from one another, three of which can be seen in FIG. 1. Between the wire feeder 24 and the device 26, there is also a heater 30 in the form of a hot air blower 102, which warms the material of the ductwall in the area of the receiving groove 18. Finally, in the area of the device 22, there is also a suction nozzle 32 for removing milling dust. The various work stations just mentioned are described in detail below:

The guide roller system 28 shown in FIG. 2 consists of a first guide roller 34 on e.g. the left side of the receiving groove 18, a second guide roller 36 on the opposite (right) side of the receiving groove 18, and a third guide roller 38 opposite the receiving groove 18. The axes 40 and 42 of the first and second guide rollers 34 and 36 are parallel to each other, and to a plane containing the receiving groove 18 and the cable duct axis 44. The axis 46 of the third guide roller 38, on the other hand, runs perpendicular to the two other axes 40 and 42.

The third guide roller 38 is sprung against the duct wall 16, by means of two spiral pressure springs 48 as shown in FIG. 2 These are supported at one end by a base plate 50, and on the other side by the bearing shaft 52 of the third guide roller 38. In order to align the bearing shaft 52, it is slide mounted on two bolts 54 which stand out from the base plate 50, and run parallel to the axis 46. The bolts 54 run through corresponding bore holes 56 in the base plate 52. In order to support the first and second guide rollers 34 and 36, their bearing shafts 58 and 60 are mounted on a common transverse member 62.

As shown in FIG. 2, the third guide roller 38 lies with its surface against the duct wall 16, covering an angle of about 130°. The third guide roller 38 is therefore symmetrical about a radial plane through the center of its length, with the smallest diameter of the roller in the region of its longitudinal centre. In order for the surface of the roller to lie against the duct wall 16, the generatrix of the guide roller 38 therefore forms an arc of a circle. In the region of its longitudinal centre, the third guide roller 38 rolls against the duct wall 16 without friction.

The first and second guide rollers 34 and 36 on the other hand taper towards their lower ends as shown in FIG. 2, terminating in the axial plane 64 which is perpendicular to the axes 40 and 42, and located in the region of the cable axis 44. At this point, they lie against the duct wall 16 more or less without friction. The basic shapes of the two guide rollers 34 and 36 correspond to the two halves of the third guide roller 38, sectioned in a plane through its longitudinal centre. The length of each of the two guide rollers 34 and 36 is nevertheless greater than half that of the guide roller 38, so that the angle over which they lie against the duct wall is slightly less than 90°, since the receiving groove 18 lies facing upwards between the two guide rollers, where it is freely accessible.

Figure 3:
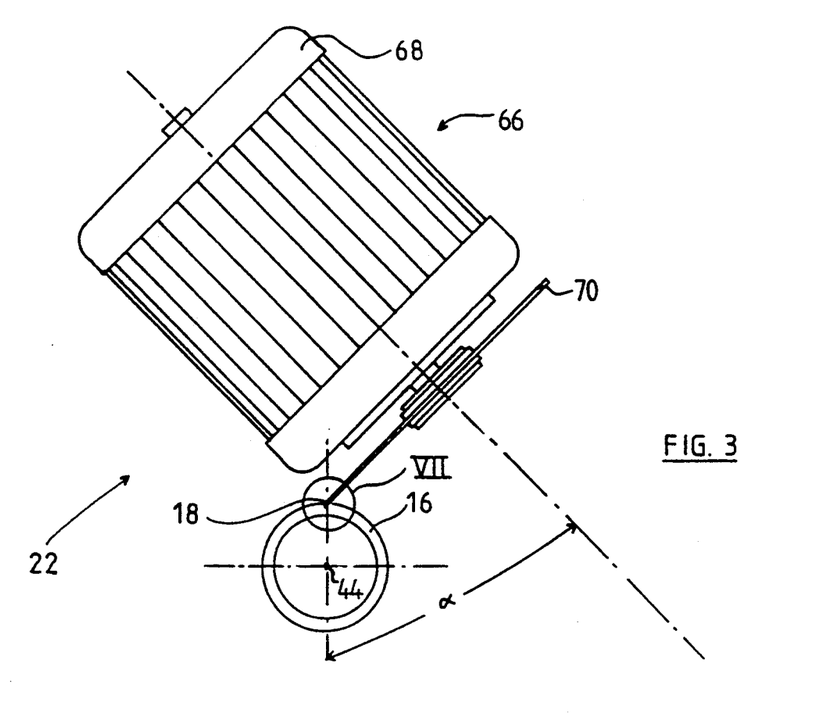
FIG. 3 a sectional view of the arrangement in FIG. 1 along line III—III.

The construction of the device 22 for fashioning the receiving groove 18 in the duct wall 16 can be deduced from FIG. 3. In the embodiment shown here, this device consists of a milling device 66 with a drive motor 68 and a rotating grind wheel 70 driven by said motor. The grind wheel 70 is preferably a diamond wheel. In FIG. 7 the part of the circumference of the grind wheel 70 which engages in the receiving groove 18 is shown by a dot-dash outline. From FIG. 3 it can be seen that the grind wheel 18 is inclined at an angle $\alpha$ of 45° to the receiving groove and to the cable axis 44. The grind wheel 70 has a rectangular section, so that the receiving groove 18 obtains a correspondingly V shape. In order to obtain even wear of the circumferential edge of the grind wheel 70, the thickness a of the grind wheel 70 essentially corresponds to the corresponding width of the left-hand wall 72 of the groove, shown in FIG. 7. Due to the 45° inclination of the grind wheel 70, the opposite wall 74 has the same width. The milling device 66 is stationary mounted. Since the cable duct 12 is transported past the milling device in direction; A, the grind wheel 70 which bites into the duct wall 16 accordingly generates the receiving groove 18 along the length of the duct wall 16.

The material of the wall 16 machined out of the wall (milling dust) by the grind wheel turning in direction B is evacuated by the suction nozzle 32 which has already been mentioned.

In order to introduce the detector wire 14 into the receiving groove 18 formed in this way, the wire feeder 24 is used, as has already been mentioned. This consists of a wire supply holder 76 containing a coil of wire 78, shown in FIG. 1 by dotted lines, a wire brake 80, and a wire direction-changing roller 82. The wire brake 80 in turn consists of a tension wheel 84 about which the detector wire 14 is looped, and on whose circumference a brake shoe 86 rubs. The detector wire 14 drawn from the wire coil 78 is thus led successively over the tension wheel 84, and then over the direction-changing roller 82 through an angle of 90° directly into the receiving groove 18 in the region of the base 92 of the groove (FIG. 5).

Figure 4:
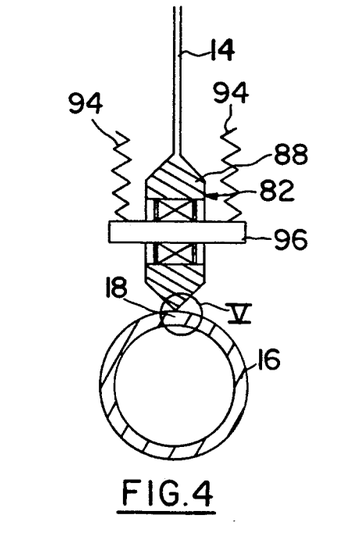
FIG. 4 a sectional view of the arrangement in FIG. 1 along line IV—IV.

As shown in FIGS. 4 and 5, the wire direction-changing roller 82 bears a circumferential projection 88 which is wedge-shaped in section, which as shown in FIG. 5 corresponds to the section of the receiving groove 18, except for an additional circumferential groove 90 which lies opposite the base 92 of the receiving groove 18 and accepts the detector wire 14.

As shown in FIG. 4, the wire direction-changing roller 82 is held by spring tension (coil pressure springs 94 in FIG. 4, which press against the bearing shaft 96 of the wire direction-changing roller 82) against the cable duct 12. As a result the sides 98 of the circumferential projection 88 lie against the corresponding sides 72 and 74 of the receiving groove 18, so that the wire direction-changing roller 82 is turned along by the cable duct 12, and so that as the detector wire 14 leaves the wire direction-changing roller, it is enclosed on all sides by the receiving groove 18 and the circumferential groove 90. In this way the space 100 with a square section seen in FIG. 5 is formed, thus acting as a guide space for the detector wire 14 between the circumferential groove 90 and the base 92 of the receiving groove. This square section is designed so that the detector wire 14 is inserted accurately in the region of the base 92 of the receiving groove 18, yet so that there is sufficient play for the following section of the detector wire 14, between the wire direction-changing roller 82 and the device 26, for supplying filler material 20, to be kept under enough tension as a result of the braking effect of the wire brake 80.

Figure 6:
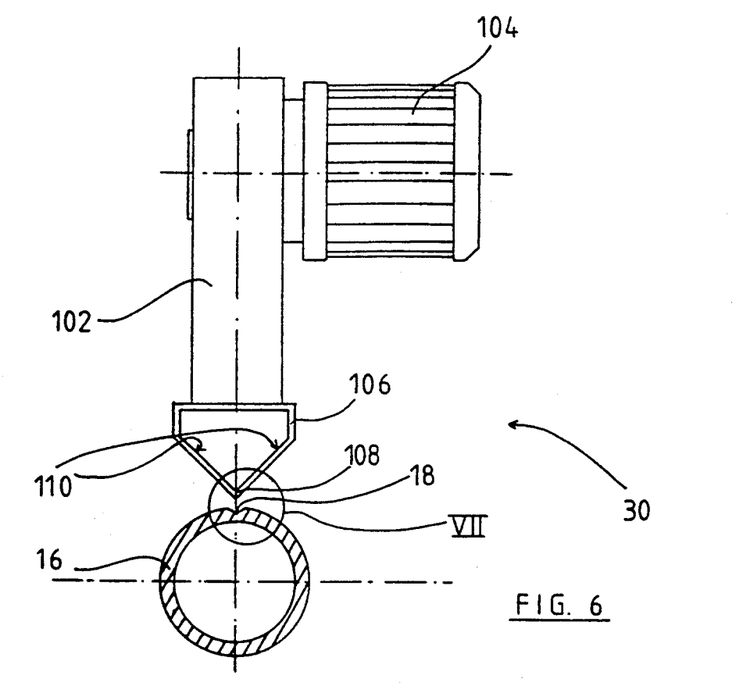
FIG. 6 a sectional view of the arrangement in FIG. 1 along line VI—VI.

In order to prepare for welding the duct wall 16 to the filler material 20 supplied by the device 26, the duct wall 16 is heated directly before the device 26 in the region of the receiving groove 18, preferably up to the melting point of the material of the duct wall. For this purpose, the heating device 30 is used, whose construction can be deduced from FIGS. 6 and 7. FIG. 6 shows a hot air blower 102 with a drive motor 104 and a slit nozzle assembly 106. The slit nozzle assembly 106 has a slit nozzle 108 at a very small distance from the receiving groove 18 and extending along it, so as to direct the hot air directly onto the receiving groove and onto the detector wire 14 laid in it. For this purpose, the slit nozzle assembly 106 is correspondingly wedge shaped, with the sides 110 tapering towards the bottom, where the lower edges of these sides are at a distance from each other so as to form the slit nozzle 108.

The flow volume of the air, the temperature of the air, and the length of the slit nozzle 108 (parallel to the direction of transport A) are chosen according to the speed of transport of the cable duct 12.

Figure 8:
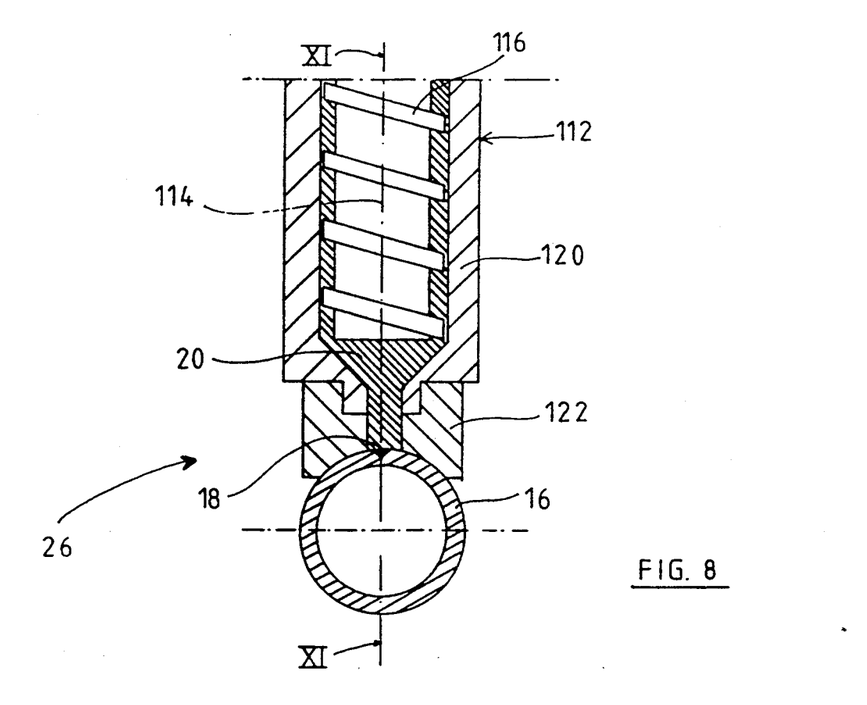
FIG. 8 a sectional view of the arrangement in FIG. 1 along line VIII—VIII.
Figure 9:
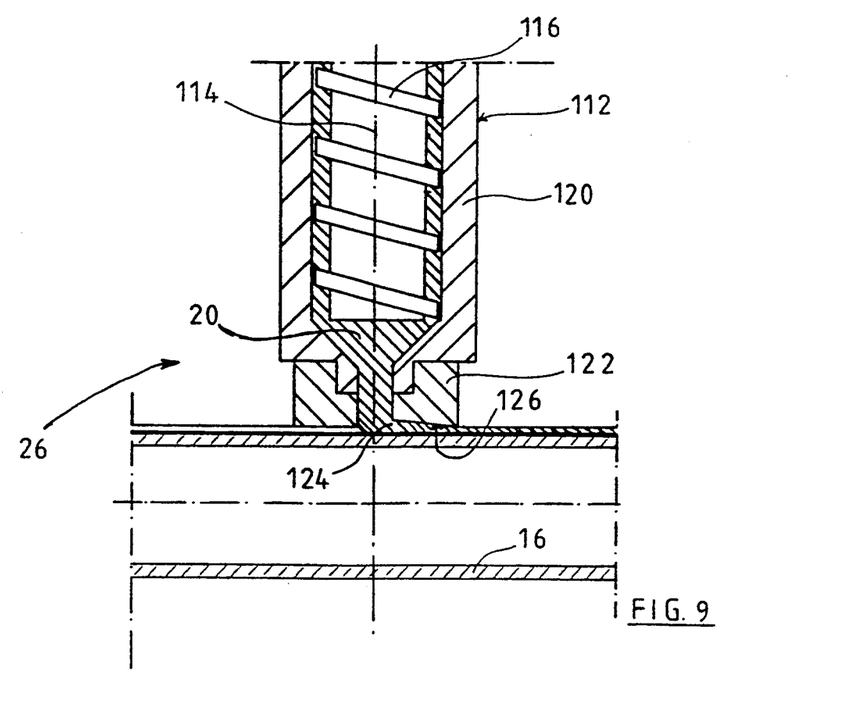
FIG. 9 a sectional view of the arrangement in FIG. 8 along line IX—IX.

In the receiving groove 18 which is brought up to melting temperature in this way, filler material 20 in the form of softened plastic is introduced with the help of the device 26. In the embodiment example shown, a worm extruder 112 is used, whose construction can be deduced from FIGS. 1, 8 and 9, with the worm axis 114 perpendicular to the direction of transport A of the cable duct 12. FIG. 1 shows an extruder worm 116 with side-mounted drive motor 118, a housing 120 for the extruder worm 116, and an extruder nozzle in the form of an applicator 122 which lies against the duct wall 16. Said applicator 122 has a channel 124 for conducting the filler material 20 out of the housing 120 into the receiving groove 18. In order to seal off the receiving groove 18 in the direction opposite to the direction of transport A, the applicator 122 projects into the receiving groove 18 to a greater or lesser depth (left part of FIG. 9). In the other direction, by contrast, the applicator 122 has a moulding surface 126 at a corresponding distance from the base of the groove, which determines the surface form of the filler material introduced into the receiving groove after it leaves the applicator 122. The moulding surface 126 can be shaped in such a way that the surface of the filler material either projects from the duct wall 16 or is level with it. The applicator 122 is preferably made of tetrafluoroethylene (Teflon), thus giving a particularly smooth surface to the filler material 20. In any case, the applicator 122 ensures that the filler material 20 encloses the detector wire 14 on all sides, without the formation of air bubbles, pores, or cracks. Due in particular to the preheating of the receiving groove 18, the filler material 20 is intimately bonded with the material of the duct wall 16, giving perfect electrical insulation and proof against corrosion of the detector wire 14, even after the cable duct 12 has been buried for years.

In order for the quantity of filler material 20 delivered by the worm extruder 112 to correspond to the transport speed (which may not always be constant) of the cable duct 12 during manufacture, there is a regulating device 128, shown symbolically in FIG. 1. A sensor 130 which measures the instantaneous transport speed of the cable duct 12 is connected via an electrical connection 132 to a regulating unit 134, which in turn controls the drive motor 118 via connection 136. The sensor 130 can consist of a toothed wheel 140 made of steel which is held against the cable duct 12 under spring pressure (spring 138), on which is mounted a pulse generator 142. The pulse generator 140 delivers pulses to the regulating unit 134 according to the speed of rotation of the toothed wheel 140.

Figure 10:
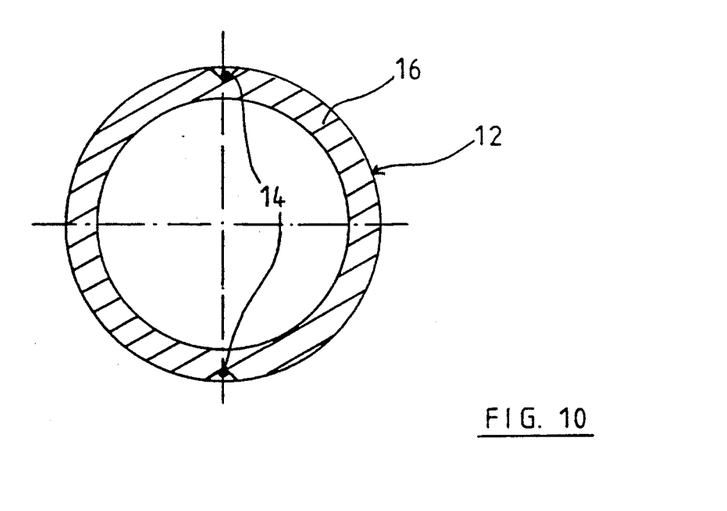
FIG. 10 a cross-section of the duct obtained by means of the apparatus according to FIG. 1, with two detector wires.

In order to obtain the cable duct 12 shown in section in FIG. 10 with two detector wires 14 lying opposite each other (each on a neutral bending line in order to prevent any problems arising when the cable is coiled up, due to the different elasticity of the detector wire 14 and duct wall 16), after leaving the device 10 as shown in FIG. 1, the cable duct 12 next runs through another device 10 similar in construction to the first but orientated at 180° to it, in order to embed the second detector wire 14. If appropriate, the two devices can be mounted opposite each other on either side of the cable duct 12.

The material used for the cable duct 12 is high-density polyethylene (HDPE); for the detector wire 14, enameled copper wire can be used.

The individual work stations shown in FIG. 1 (device 22, wire feeder 34, heater 30 and device 26) are arranged perpendicular to the direction of transport A so that their position can be finely adjusted, by means not shown, in order to achieve a precisely defined sectional shape of the receiving groove 18, accurate positioning of the detector wire 14 inside the receiving groove 18, and accurate filling and welding of the receiving groove 18 with filler material 20.

Figure 11:
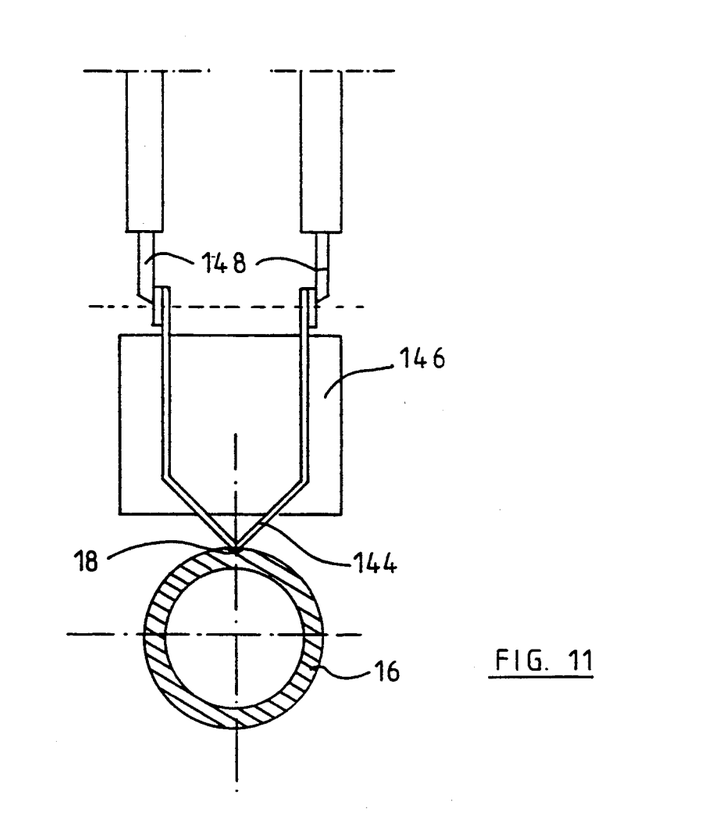
FIG. 11 a sectional view similar to FIG. 3, showing a modified embodiment.

The receiving groove 18 can be made by a method other than by milling. According to the alternative embodiment shown in FIG. 11, a V-shaped draw knife 144 corresponding to the shape of the receiving groove can be used, where said draw knife 144 cuts a corresponding cutout of the duct wall 16. The draw knife 144 is stationary mounted (holder block 146). In order to reduce the forces which occur, the draw knife 144 can be heated electrically. FIG. 11 shows two electrical leads 148 for this purpose, each of which is electrically connected to one end of the arch-shaped draw knife 144.

Figure 12:
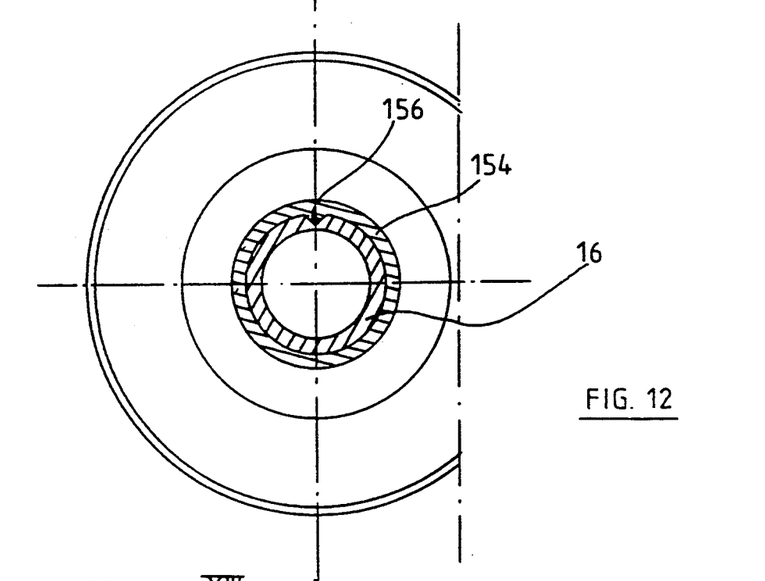
FIG. 12 a sectional view similar to FIGS. 3 and 11 showing another modified embodiment (section along line XII—XII in FIG. 13)
Figure 13:
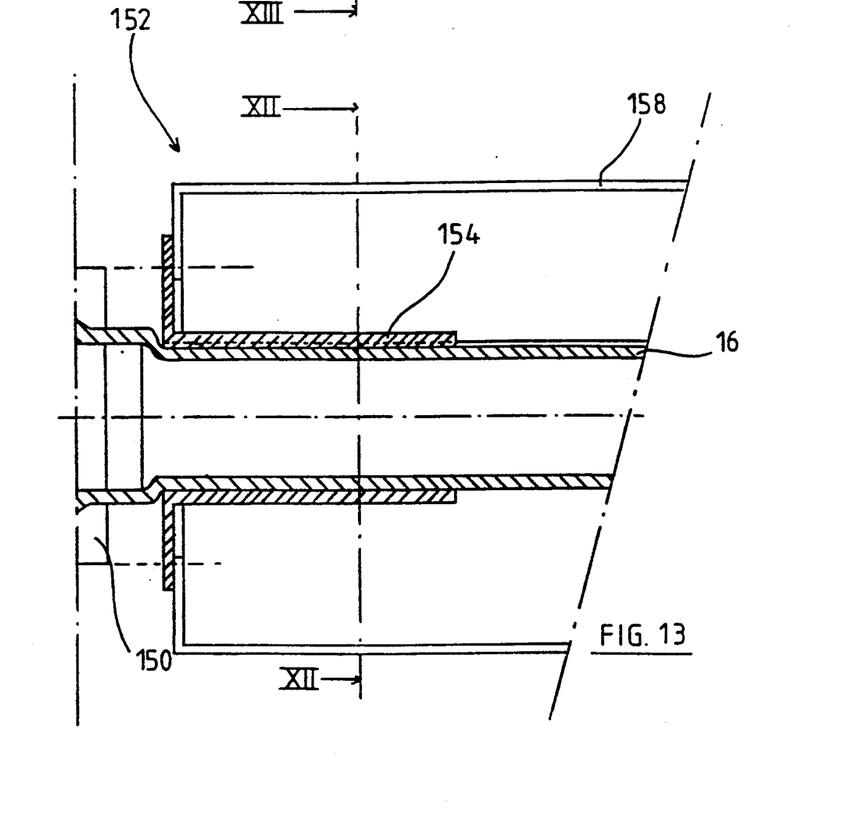
FIG. 13 the arrangement in FIG. 12 along line XIII—XIII.

The receiving groove 18 can alternatively be fashioned in the duct wall 16 without stock removal, in particular directly after leaving a tubular injection moulding nozzle 150 for manufacturing the cable duct 12. As shown in FIGS. 12 and 13, the tubular injection moulding nozzle 150 is followed in the normal way by a gauging device 152 which gives the duct wall 16 the required external shape while the duct wall 16 is gradually cooled. For this purpose, the gauge tube 154 normally used is slightly modified by forming a spur 156 with a V-shaped cross-section corresponding to the cross-section of the groove, as shown in FIG. 12. This spur 156 should preferably extend over the whole length of the gauge tube 154. The gauge tube 154 is mounted in the usual way in a gauge tube holder (158). The cable duct 12, which is gauged, and has the receiving groove 18 made in it in this way is then hardened in the water cooling station which follows. The subsequent laying of the detector wire 14 can once again be carried out with the detector wire 14 being placed at a precise depth inside the duct wall 16.

On buried cable ducts 12 with a detector wire 14 or two detector wires 14 of correspondingly great length, it is unavoidable for the cable duct to be interrupted at certain points in order to fit couplings, elbows, branches, and suchlike in the length of the cable. For this purpose, the cable duct 12 laid in a trench is cut at the corresponding point, and is shortened by the length of the fitting. Once the fitting has been installed, it must be bridged electrically, i.e. an electrically conducting connection must be made between the detector wires of the two sections of cable duct terminated in this way.

A device for bridging the fitting with an electrically conducting connection between the cable duct sections must meet the following criteria: the electrical connection in the ground must be ensured in the long term, since the cable duct must remain detectable for a practically unlimited time. The device must be extremely easy to fit, i.e. it must be capable of being fitted quickly, even by unskilled personnel, under the most difficult conditions of burial, with absolute certainty that it will work.

Figure 14:
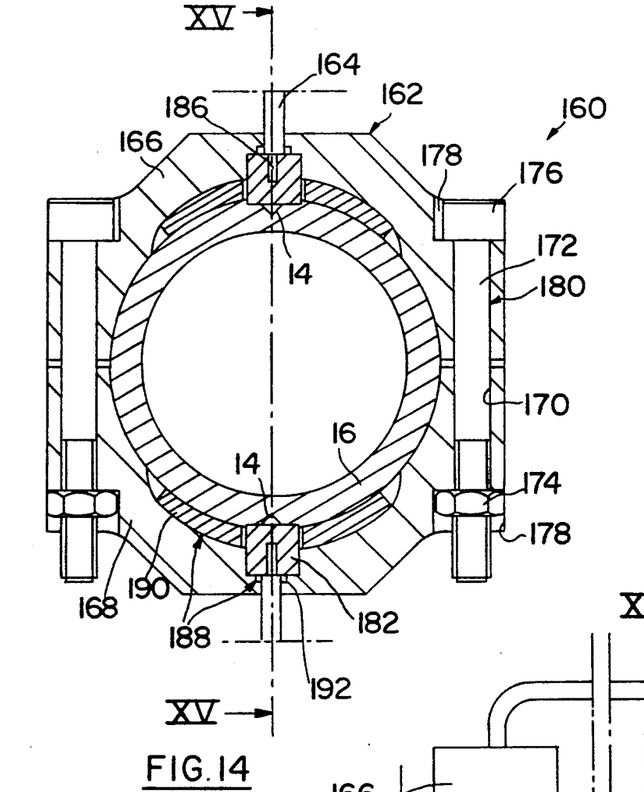
FIG. 14 a section through a duct with a collar for electrical connection of two sections of duct (section along line XIV—XIV in FIG. 15)
Figure 15:
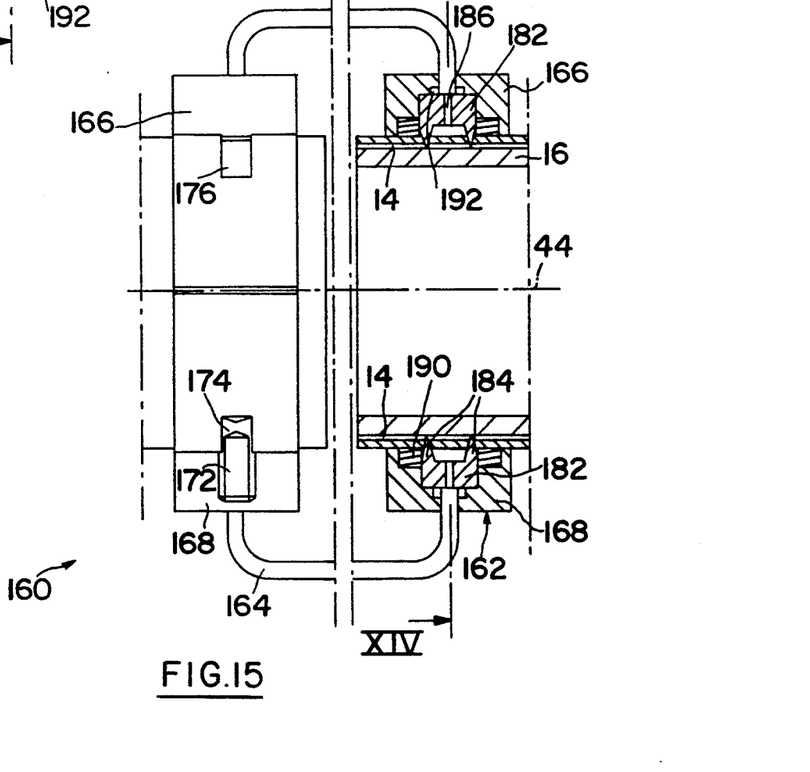
FIG. 15 section of the arrangement in FIG. 14 along line XV—XV.

A device 160 which meets these requirements is shown in FIGS. 14 and 15. It consists of two collars 162 and two insulated, electrically conducting cables 164. The two collars 162 are both identical.

Each collar 162 is made in two parts, with an upper part 166 and a lower part 168. The upper part 166 and lower part 168 can also be identical.

Each part 166, 168 is more or less bridge-shaped in order to enclose the cable duct 16 over 180°. At each of the ends of the bridge, there is a hole 170 to take a threaded bolt 172. In order to take a hexagonal screw 174 or a bolt head 176, the hole 170 can be surrounded by a hexagonal recess 178 at one end opposite the other part 166 and 168. Alternatively, in order to save space the hole 170 can be closed at one end, as shown in FIGS. 14 and 15. The bolt head 176 of the threaded bolt 172 is in the form of a cylindrical socket head, so that it can easily be turned while the hexagonal nut 174 is being fitted on the other end of the bolt within the part opposite (part 168 in FIGS. 14 and 15) when the collar 162 is being assembled. Once the two screw joints 180 of one of the collars 162 have been formed by the threaded bolt 172 and hexagonal nut 174, the two parts 166 and 168 lie against the cable duct 16 and against each other (at the ends of the bridge). This gives a well-defined clamping pressure, which can simply be achieved, even by unskilled personnel. To facilitate stockkeeping and assembly, the two hexagonal nuts 174 can be pressed into the part 168. Locking after assembly is not necessary. As a result of the counter-moment suddenly increasing when the two parts 166 and 168 come together as the screw joint is being tightened, it is practically impossible for the screw joint to be tightened too much.

When the two parts are clamped together, a knife contact 182 in each of the parts 166 and 168 cuts in a well defined manner into one or other of the detector wires 14 in order to make a permanent electrical contact between the detector wire 14 and knife contact 182. Each knife contact 182 has at least two blades 184 separated from each other in the direction of the axis 44 of the cable duct 12, so that normally two electrical contacts but certainly at least one electrical contact is made with the detector wire. The knife contacts 182 are made of brass. One end of the cable 164 is soldered to each knife contact 182. The figures show a corresponding bore hole 186 in each knife contact 182 to receive the conductor of the insulated cable 164.

Since each knife contact 182 cuts through the wall material 20 of the cable duct 12 so that it bites into the detector wire 14, and thus removes the insulation of the detector wire 14 on the side facing outwards, a sealing system 188 is fitted within each part 166 and 168, in order to provide an outer seal at these two points. In the embodiment example shown, each sealing assembly 188 consists of a sealing ring 190 between the cable duct 16 and cable collar 162, and a sealing ring 192 between the knife contact 182, cable 164, and the corresponding part 166 and 168. The sealing ring 192 can consist of a simple O-ring. The sealing ring 192 can consist of a flat ring seal, made of closed pore foam material, preferably synthetic rubber (neoprene). The sealing ring 192 in this way reliably prevents air or moisture penetrating along the cable 164 at the knife contact 182. As a result, the system has long-term corrosion resistance. Since the two knives 184 each penetrate into the copper detector wire 14 by a definite amount (forming a V-shaped notch), a contact area with a wide surface is obtained, thus ensuring good electrical contact.

In order to enable large fittings to be bridged simply, the cables 164 have a length of one meter.

I claim:

1. A cable duct of synthetic plastic material which can be laid in the ground, with at least one electrically conducting detector wire along a neutral bending line in a wall of the duct, a receiving groove in the duct wall receiving the detector wire, and a separate filler material welded to the duct wall embedding the detector wire in the duct so that the detector wire is enclosed on all sides.

2. A cable duct as claimed in claim 1 wherein the receiving groove extends to an outer surface of the duct, and the detector wire is disposed in the receiving groove.

3. A cable duct as claimed in claim 2 wherein the receiving groove has a V-shaped cross section.

4. A cable duct as claimed in claim 2 wherein the cable duct has a longitudinal axis, and the neutral bending line extends parallel to the axis.

5. A cable duct as claimed in claim 2 wherein the detector wire comprises enameled copper wire.

6. A cable duct as claimed in claim 2 wherein the filler material comprises plastic.

7. A cable duct of synthetic plastic material which can be laid in the ground, with at least one electrically conducting detector wire placed at controlled depth in the wall of the duct, comprising a receiving groove extending to the outer wall surface of the duct, a detector wire laid in said groove in a filler material welded to the duct wall and enclosing the detector wire on all sides.

8. A cable duct as claimed in claim 7 wherein the receiving groove has a V-shaped cross section.

9. A cable duct as claimed in claim 7 wherein the cable duct has a longitudinal axis, a neutral bending line extending parallel to the axis, whereby the groove lays along said neutral bending line.

10. A cable duct as claimed in claim 7 wherein the detector wire comprises enameled copper wire.

11. A cable duct as claimed in claim 7 wherein the filler material comprises a material identical or similar to the material of the duct.

* * * * *